Oct. 31, 1939.  L. G. BLACK  2,177,766
PROCESS FOR PRODUCING FUSED PRODUCTS
Filed May 9, 1936  3 Sheets-Sheet 1
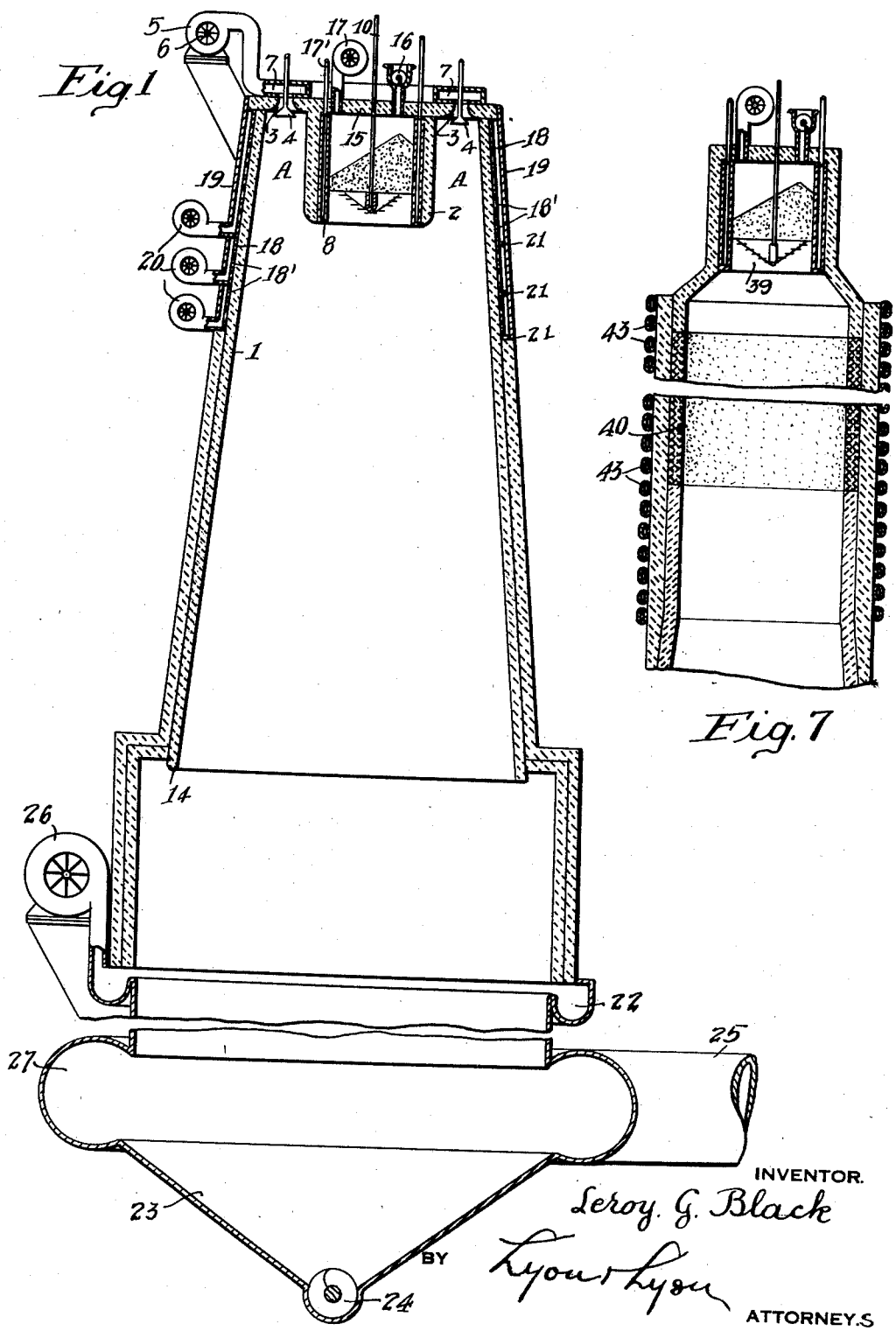
INVENTOR.
Leroy G. Black
BY
ATTORNEYS Oct. 31, 1939.  L. G. BLACK  2,177,766
PROCESS FOR PRODUCING FUSED PRODUCTS
Filed May 9, 1936   3 Sheets-Sheet 2
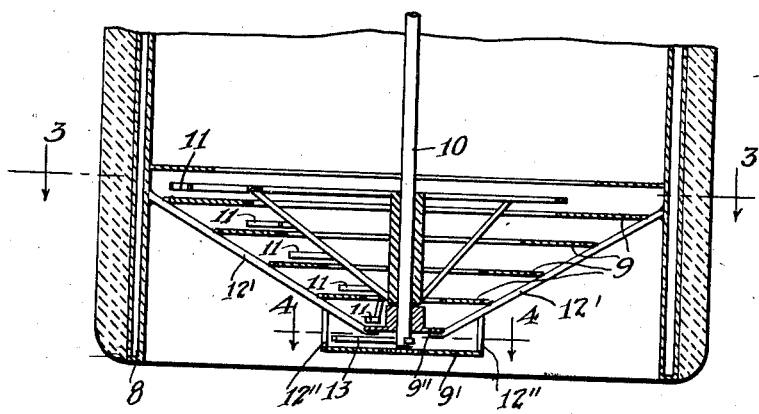
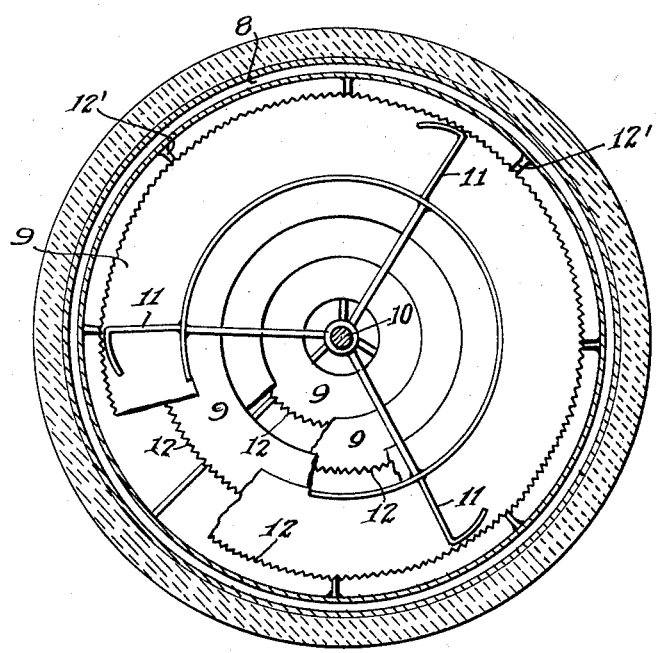
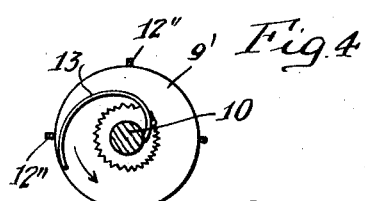
INVENTOR.
Leroy G. Black
BY Lyon & Lyon
ATTORNEYS Oct. 31, 1939.   L. G. BLACK   2,177,766
PROCESS FOR PRODUCING FUSED PRODUCTS
Filed May 9, 1936    3 Sheets-Sheet 3

INVENTOR.
Leroy G. Black.
BY Lyon & Lyon
ATTORNEYS

Patented Oct. 31, 1939

2,177,766

UNITED STATES PATENT OFFICE 2,177,766

PROCESS FOR PRODUCING FUSED PRODUCTS

Leroy G. Black, Trona, Calif., assignor to American Potash & Chemical Corporation, Trona, Calif., a corporation of Delaware Application May 9, 1936, Serial No. 78,898

3 Claims. (Cl. 23—59)

This invention relates to the treatment of solid materials for producing fusion thereof and has particular reference to the preparation of a fused borax product.

It is a general object of the present invention to provide a process for producing vitreous borax glass directly in the form of finely divided particles, which may be readily comminuted to a greater extent, if desired. Ordinarily, when borax is dehydrated and then fused there is produced a vitreous product known as borax glass. This material is very hard and dense and as usually produced, must be ground or comminuted in some manner. Borax glass is a material of considerable hardness, and it is, therefore, difficult to comminute. When borax glass is comminuted, it is usually contaminated with metallic particles from the surface of the grinding equipment. This contamination is undesirable, both as it is an impurity in the resultant product and because it represents abrasion from the surfaces of the grinding equipment. The cost due to the abrasion of the grinding equipment and the cost due to the removal of impurities from the comminuted borax glass are both so large that in general it has been found impractical to produce a comminuted anhydrous sodium tetraborate from borax glass.

The present invention is directed to providing a process by which fused borax may be obtained in finely divided particles, and which finely divided particles are of a form which may be readily comminuted to a still finer state, if desired. The invention generally comprehends that fused borax particles in a finely divided form may be attained if the fusion of the borax and cooling of the fused borax into the vitreous form is carried out upon particles which are maintained substantially discrete throughout the process.

Maintaining the feed material in individual particles throughout the fusion thereof and subsequent cooling is obtained in the process and apparatus of the present invention through conducting the operations of fusion and subsequent cooling upon individual particles of feed material while they are falling through a treating zone.

In the present invention there is provided a process by which the material to be fused and subsequently cooled to form borax glass is fed into a treating zone in the form of carefully segregated particles. The invention also includes means in said zone by which the falling particles may be heated to the fusion state while they are maintained separate, and then subsequently cooled while still falling through the zone, so that as a result thereof there are produced finely divided particles of fused borax.

In the preferred form of the process, raw material for producing granular vitreous sodium tetraborate preferably comprises the form of hydrated sodium tetraborate, which contains as small an amount of water as possible. By feeding hydrated sodium tetraborate having a low water content to the dehydrating furnace, it is much more easy to fuse the particles while they still remain separate and discrete, and subsequently cool them into the form of vitreous glass. While the process is not necessarily restricted thereto, I find it of advantage to make a preliminary partial dehydration of borax to produce the raw material for use in the process and apparatus of the present invention. For example, the water content of borax, $Na_2B_4O_7.10H_2O$, is preferably reduced to that corresponding to the monohydrate of sodium tetraborate, $Na_2B_4O_7.H_2O$, before the material is fed into the furnace of the present invention.

Where the sodium tetraborate or borax is to be partially dehydrated before being processed in the process and apparatus of the present invention, this preliminary dehydration is preferably carried out so as to avoid puffing of the material. One process by which such dehydration may be carried out is described in British Patent No. 330,146, issued June 5, 1930, to the American Potash & Chemical Corporation.

In accordance with the present invention, such hydrated sodium tetraborate is fed in a granular form into the down-draft furnace so designed that the particles of the tetraborate material do not come in contact with the furnace surfaces when they reach the fused condition, and pressures are so controlled that appreciable aggregation of the particles does not occur. It has been found that when the proper pressure and temperature conditions prevail in the furnace and when the rate of feeding and physical characteristics of the raw material are properly controlled, it is possible to fuse and then cool the individual particles to produce a granular finely divided dehydrated product.

In the preferred form of the process of the present invention the raw material passed through a down-draft radiation type of furnace, in which the heating or the fusion zone is preferably located more or less centrally within the chamber between the heat inlet ports at the top of the chamber and a collecting chamber or zone at the bottom thereof.

Between the collecting chamber zone and the fusion zone, which is the zone of highest temperature, there is provided a further zone through which the particles fall and in which the temperature is lower than the melting point of borax glass. By this method and apparatus the particles of partially dehydrated sodium tetraborate fed in at the top and preferably under pressure sufficient to keep the particles discrete as they enter the furnace pass downwardly first into a heating or fusion zone in which they are first dehydrated, then fused and finally in the cooler zone cooled so that vitrifaction takes place before the particles fall into the collecting zone.

In an apparatus of the present nature, it is important to reduce swirling, turbulence, local action, etc., of the gases in the fusion zone of the furnace to a minimum, as such action tends to cause aggregation of fused particles with the result that the final product will not be uniformly divided. Turbulence within the fusion zone will also bring the fused particles into contact with the furnace walls. Contact of the fused borax with the furnace walls is to be avoided as much as possible, since fused borax is a highly corrosive substance which will attack refractory materials very rapidly, causing both the rapid deterioration of the furnace and a contamination of the product of the furnace. This balance of gas currents and pressures within the furnace is accomplished in part with the design of the furnace and in part by the operation thereof, all as will be more clearly explained.

The present invention, together with various additional objects and advantages thereof, will best be understood from a description of the preferred form of process and apparatus for producing borax glass in a finely divided condition, which process and apparatus embodies the present invention. The description is given in connection with the accompanying drawings, in which—

Figure 1 is an elevation mainly in vertical section of one form of the fusion furnace;

Figure 2 is an enlarged fragmentary elevation, mainly in vertical section, of the feeding mechanism;

Figure 3 is a section on the line 3—3 of Figure 2;

Figure 4 is a section on the line 4—4 of Figure 2;

Figure 7 is an elevation, mainly in vertical section, of a further modified form of heating and feeding mechanism for the furnace.

Figure 5:
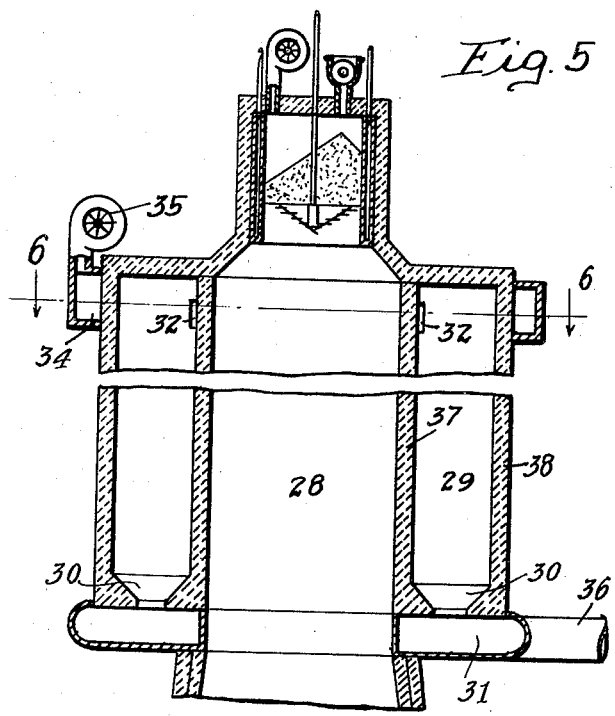
Figure 5 is an elevation, mainly in vertical section, of a modified form of heating and feeding mechanism for the furnace.

Referring to the drawings, and particularly to Figures 1, 2, 3 and 4 thereof, the furnace is illustrated as preferably comprising a main wall 1 of porous refractory material. At the upper end of the furnace there is provided a concentric depending tube 2 for housing the feeding elements of the furnace, and surrounding the tube 2 there is formed a plurality of firing ports 3. Within each firing port 3 is provided a burner 4 for directing a flame downwardly through the annular space formed by the tube 2 and wall 1 into the fusion zone of the furnace. The furnace is preferably provided with a blower 5 or other suitable means for taking air from an inlet, such as 6, and distributing the same through passages 7 to the burners 4 to create a down-draft in the furnace, the combusted gases being withdrawn from the lower portions of the chamber, as is more thoroughly hereinafter described. The length of the firing section A of the furnace is preferably sufficient to permit the retention of at least the reducing portion, and preferably also the greater part of the luminous portion of the flames from the burners 4 within the annular refractory walled space formed by the furnace wall and the depended feeding section, so that these portions of the flame of the burners will not be brought into contact with the particles of material which are to be dehydrated and fused within the chamber. Undesired turbulence and local action of gas currents in the furnace is greatly reduced by thus segregating the fuel combustion zone from the reaction zone in the furnace. To further decrease turbulence, reduce gas velocity, and minimize contact of the falling particles of material with the refractory of the wall the preferred furnace is made in the form of a hollow cone with increasing cross-section toward the bottom. A furnace with cylindrical wall is operable under the teaching of this invention, but it has been found that the expanding cross-section of the furnace in addition to reducing the contact between refractory and falling particles also serves to permit some reduction in the length of path that must be traversed by each particle to complete the reaction—i. e., the height of the furnace may be reduced slightly without loss of capacity.

Within the center tube 2 of the furnace is located a feeding device, the primary function of which is to cause a uniform feeding of the furnace with separated particles of material. This feeding device comprises a cylindrical water jacket 8, which supports near the lower end a series of offset flat annular metal plates 9 spaced apart so that a pile of granular particles at the angle of repose will seal the opening between each pair of plates, as in Figure 3. A centrally placed vertical shaft 10 carrying a series of radial plows 11 is arranged so that one or more plows extends into or through the opening between each pair of plates. In operation, the shaft is caused to revolve, resulting in the plows 11 forcing the granular sealing material over the serrated lip 12 of each plate. The plates 9 are supported by thin bars 12', fastened to the wall 8 on one end and the fixed plate and bearing 9'' on the other. The plate 9'' seals the inner edge of the lower plate 9'. Material is forced over the outer edge of plate 9'' by the offset plow 11 to fall to the plate 9'. Plate 9' is supported by bars 12'' which in turn are fastened to bars 12'. The pile of material on plate 9' is drawn toward the inner edge by spiral plow 13. This lower plate 9' and plow 13 are provided to feed material around the lower end of the central shaft so that a more even distribution of particles will be obtained throughout the cross-section of the furnace. The granular borax or other material is pushed over the lip by the plows 11 and 13 in small discrete masses which fall into the reaction zones of the furnace, where they are subjected to the heating, cooling, and other actions taught by this invention. By control of the draft, rate of feed, etc., essentially no contact is obtained between the particles themselves or parts of the apparatus during the operation of this invention.

The small proportion of the particles which impinge and fuse on the refractory wall of the furnace run down and drip from the overhanging ring 14. At the upper end the feeding tube is closed by a wall 15, to which is connected a screw conveyor 16 for filling the tube with a material to be charged to the furnace. A blower 17 is also connected with the top of the tube for the purpose of supplying a slight down-draft pressure controlled by damper 17' to assist in feeding the material into the furnace and to keep the divided particles of material separate while they are falling through the furnace. The air which enters through the feeding device serves another purpose in that as it leaves the edges of the serrated plates, it maintains a zone of cooled air immediately therebelow, thereby to an extent protecting the feeding device from the heat of the burners 4.

The conical wall 1 of the furnace is shown as preferably composed of a porous refractory material, and is provided with an outer metal wall 18 and a further metal wall 19 forming a jacket around the furnace, and to such jacket air is preferably supplied by a plurality of blowers 20 at spaced apart intervals. The metal wall 18 is perforated by suitable holes 18', so that the air in the chamber between walls 18 and 19 may diffuse through the porous brick wall 1 and enter the center of the chamber. The diffusion of air through the wall 1 of the furnace and into the furnace maintains a slight air pressure which operates in practice to prevent the falling particles of borate material from coming into contact with the walls of the furnace. The air jacket around the wall 1 of the furnace may, if desired, be separated into individual chambers by plates 21, so that the air may enter the furnace through the wall at different regulated pressures, if desired. It is also possible by this arrangement to pass air or inert gas into the furnace through one or more of the fans so as to both best control the combustion operations and temperature within the furnace. Below the fusion zone of the furnace the air jacket formed by walls 18 and 19 may be discontinued, as this portion of the furnace is to serve as a cooling zone in which the falling particles of fused borax are to be cooled to form vitreous particles. In this portion of the furnace, as shown in particular in Figure 1 of the drawings, the walls of the furnace are preferably provided with a continuous annular air inlet 22 for introducing cooling air by a fan 26 so as to reduce the temperature of the gases in the furnace throughout the cooling portion thereof.

Below the air inlet 22 the cooling zone extends for one or more furnace diameters, finally terminating in a collecting chamber 23, preferably in the form of a hopper having a discharge screw conveyor 24 at its lower end. The furnace is provided at the upper end of the collector 23 with a large outlet 27 for the gases of the furnace, from which outlet they may be led to a settling point through 25, if desired, for the collection of any entrained borate particles, or be otherwise disposed of. I have found, for example, that the hot gases from the furnace may be utilized to do the preliminary dehydration of borax before it is fed into the chamber. It is to be noted that the cross-sectional area of discharge port 27 for the hot gases should not be less than the cross-sectional area of the chamber, and preferably should be considerably greater in order to insure that a proper down-draft will be maintained.

In the operation of the process and apparatus of the present invention the borax thus passes through a dehydrating and fusion zone, i. e. that portion of the furnace below the feed outlet, illustrated in Figure 1, and then through a cooling and vitrifying portion, i. e., that portion of the furnace below the cooling air inlet of Figure 1, and hence the material is collected in the collector 23. As it leaves the furnace through the screw conveyor 24, the product will be of granular finely divided form suitable for use, without further treatment, as anhydrous borax. In some instances, however, it may be desired to provide a product which is even more finely divided. Directly contrasting this material with previous forms of borax glass, it is found that this granular product may be readily comminuted with a low force to give a product of fairly uniform particle size with a minimum percentage of fines. The fact that the product may be readily comminuted is due to some extent to the already small particle size characterizing a granular product and also to the cracking of the individual particles which takes place during vitrifaction thereof.

The process as performed in the apparatus and the operation of the apparatus are apparent from the above description, with the exception of the type of flame to be employed. The production of a product, such as borax glass, usually requires elimination of impurities so that a pure product is obtained. The greatest danger of contamination of the product in the present process results from the possibility that the product while in a fused state may absorb carbon, which is present when incomplete combustion of the fuel takes place. Complete combustion of the fuel is, therefore, to be desired. When a hydrated material is fed in the top of the furnace, incomplete combustion often results if the hydrated material comes directly in contact with the flame of the furnace. To this end, it is found desirable to make the space between side wall 1 and the wall of the feeder 2 of the furnace of sufficient size and length so that the fuel is completely combusted in this zone before it enters the furnace proper.

The fuel used to supply heat to the furnace may be oil, powdered coal or gas. In the furnace shown in Figure 1 any of these fuels may be used. When gas is used, it has been found advantageous to introduce a part or all of this fuel with the charge to the furnace. When the furnace is operated in this manner, the combustion zone is displaced downwardly to the point where the air, entering in the usual way, is sufficiently well mixed with the gas to support combustion. Combustion of the fuel and heating of the borax take place in the same zone when the invention is operated in this manner.

Figure 6:
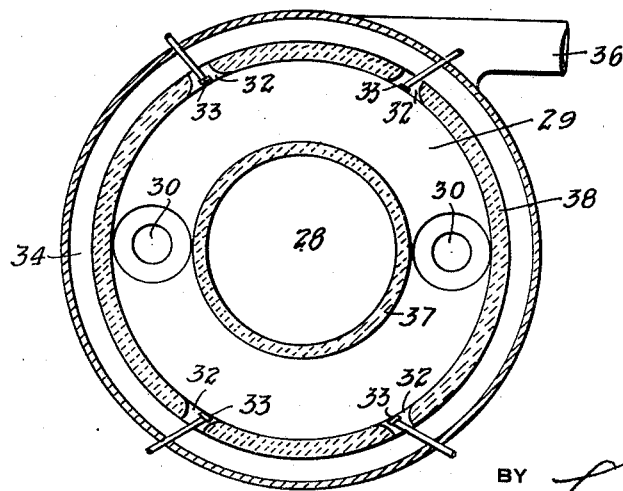
Figure 6 is a section on the line 6—6 of Figure 5.

In Figures 5 and 6 there is shown an alternative form of the furnace, which is of a muffle type, the fire box being separate from the reaction chamber. The method of dehydration or fusion is, however, substantially the same, consisting of a process of securing fusion of particles while they are falling, and maintaining the particles separate from each other and from other objects while they are in a fused state.

Referring to Figures 5 and 6, the furnace comprises a reaction chamber, preferably a cylindrical chamber 28, the upper end of which is reduced in size and supplied with a feeding device, as shown. Around the enlarged portion of the chamber 28 is provided a muffle chamber 29, in which the flame and combustion gases for the heating operation are maintained separate from the material being treated. Flues 30 and duct 31 are illustrated as the outlets for the combustion gases from the muffle chamber. As shown in Figures 5 and 6, the wall 38 of the combustion chamber 29 around the muffle chamber 28 is provided with a plurality of openings 32 through which enter burners 33. Air for combustion of the fuel is supplied to the burner openings from duct 34 under pressure from the blower 35. Fuel oil, coal or gas are fuels suitable for use in this type of furnace. The flue gas is led away to waste heat calciners or boilers through duct 36.

The refractory wall 37 between the combustion chamber 29 and the reaction chamber 28 may be constructed of any suitable refractory having a high heat transfer coefficient and at the same time having structural strength necessary for the mechanical construction of the furnace wall. It is evident from this disclosure that all of the heat available to the process must be transferred through the refractory wall 37 to the inner part of the furnace. To obtain a sufficiently rapid reaction rate for the processes involved, it has been found that the inner surface of wall 37 must be maintained at a high temperature so that rapid transference of heat by radiation is obtained to the particles of material falling within the furnace.

It is understood that the lower portion of the apparatus of Figures 5 and 6 is to be similar in construction to that illustrated in the lower part of Figure 1.

Referring to Figure 7, there is represented a furnace having a reduced portion 39 supporting the feeding element already described and shown in Figures 1, 2, 3 and 4, and an enlarged cylindrical section 40 formed of graphite or other electrically conducting material capable of resisting high temperatures, below which the wall of the furnace is formed as usual of a refractory substance. Around the electrically conducting portion of the furnace is placed a further wall of refractory supporting the copper coils 43 used to induce a high frequency electrical field around and within the furnace. The copper coils 43 extend somewhat above and considerably below the electrically conducting portion of the furnace wall so that the high frequency electrical field can be generated within the confines of the refractory portion of the furnace. It is understood that the lower portion of this furnace may be the same as the lower section of the furnace, shown in Figure 1.

In the operation of this furnace, the high frequency electrical field supplied to the copper coils induces a high-amperage, short-circuited current in the conducting wall of the furnace. This high flow of current releases heat equivalent to the product of the voltage by the square of the amperage. Although the voltage is low, the amperage is very high and a large quantity of heat is liberated in the graphite conductor 40, causing it to be heated to a radiant temperature. At the temperature of operation, the heat radiated from the surface of this secondary conductor 40 will balance the heat induced by the high frequency electrical field. The radiant heat will impinge on any particle of borax or similar salt falling within the furnace and cause heating of said particle. As the particle continues to fall and absorb heat, partial fusion on the surface will be attained, producing an electrically conducting path around the particle in which a high amperage current can be induced by the high frequency field existing in and around the furnace. The current flowing in the conducting surface of the particle produces heat which aids in completing the fusion of the particle.

Unfused borax is a poor conductor, but like many salts, such as sodium chloride, potassium chloride, etc., becomes a good conductor at the temperature of fusion. It has been found that once fusion is started on a particle of borax or other salt, the fusion can be completed by transmitting electrical energy directly to the particle without first converting this energy into heat.

While the particular form of the process and apparatus herein described are well adapted to carry out the objects of the present invention, it is to be understood that the invention is not limited to the particular form shown, but includes all such modifications and changes as come within the scope of the appended claims.

I claim:

1. A method of producing fused material in particle form, which comprises sub-dividing a supply of such granular material into a shower of separated particles as the same enters a heating zone, permitting the material to fall through said heating zone and thence through the cooling zone, supplying heat to the particles as they are falling through said heating zone and cooling the same while the same are passing through said cooling zone, and maintaining a portion at least of the walls of said heating zone under exterior gas pressure sufficient to cause the flow of gas from the walls of said zone into said zone to prevent contact of the falling material with said walls.

2. A method of fusing materials, which comprises causing material to fall in particles through a heating zone while maintaining the particles separate from each other, within said heating zone heating the particles to secure fusion thereof, then causing the particles to fall through a cooling zone while still maintaining the particles separated, in said cooling zone cooling the particles to solidify the same, and applying to a portion at least of the walls of said heating zone gas pressure and permitting sufficient of said gas to pass through the walls to prevent contact between the falling particles and said walls.

3. A process of producing a granular fused borax product, which comprises feeding into a fusion zone separated particles of hydrated borate material causing the particles to fall through said zone while the same are dehydrated, admitting a gentle flow of air through the walls of said zone to prevent contact of the falling particles with the said walls, and finally passing the falling particles through a zone in which they were cooled below the fusion temperature.

LEROY G. BLACK.